UNITED STATES PATENT OFFICE.

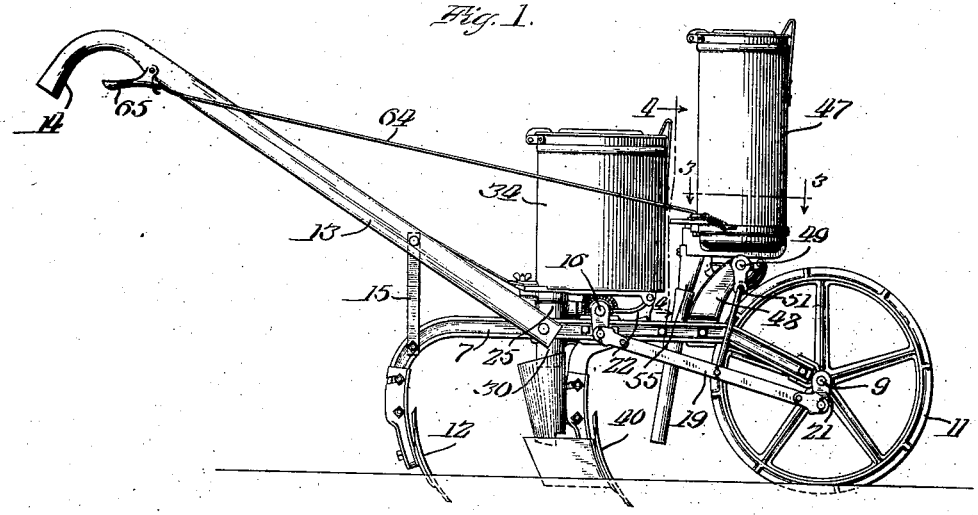
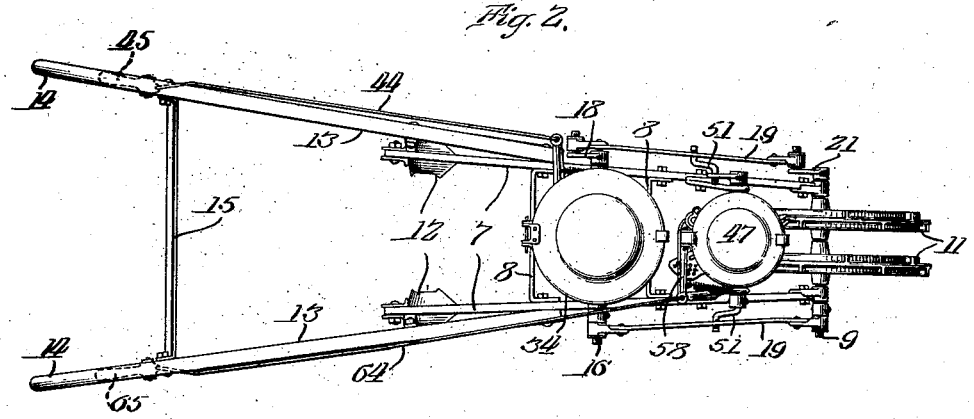

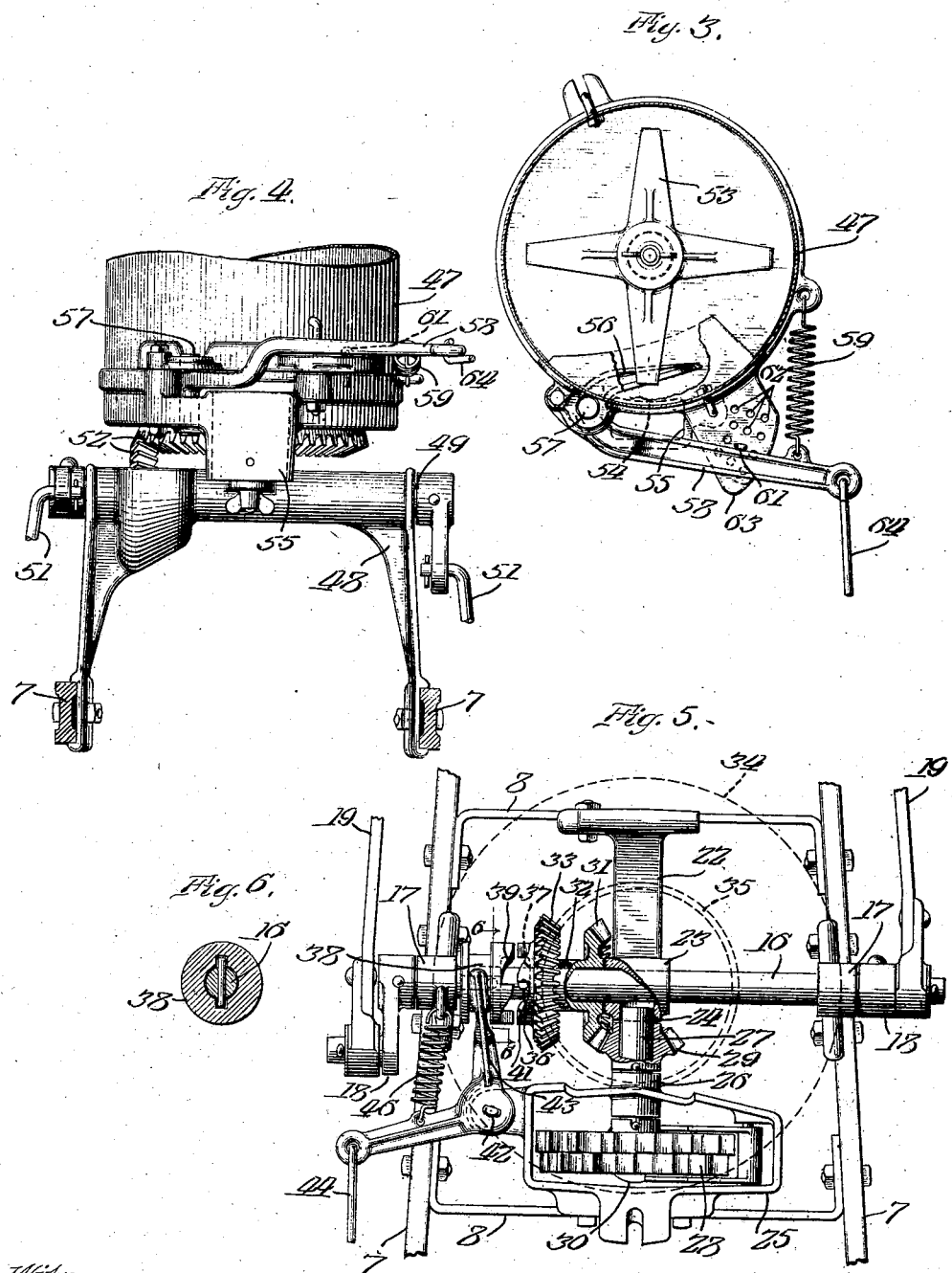

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLANTER.

1,178,766.  Specification of Letters Patent.  Patented Apr. 11, 1916.

Application filed November 23, 1914. Serial No. 873,621.

*To all whom it may concern:*

Be it known that I, LEWIS E. WATERMAN, a citizen of the United States, residing at Rockford, in the county of Winnebago and State of Illinois, have invented certain new and useful Improvements in Planters, of which the following is a specification.

This invention relates to planters for planting cotton, corn, and various other seeds, and has more particular reference to walking planters which are especially adapted to be used on small farms and which require but a single horse as the means of draft.

The aim of my invention, primarily, is to provide a planter of the above character of simple and improved construction, which will be efficient in operation, strong and durable in construction, and which may be manfactured at a low cost.

I also aim to provide in the planter an improved means for driving and operating the seeding mechanism, whereby the operator, who walks behind the planter with his hands on the handle-beams for guiding the implement, may operate means located in close proximity to the handles for rendering the seeding mechanism operative and inoperative.

Another object of my invention is to provide means operable from the handles of the handle-beams for controlling the operation of the seeding mechanism and the fertilizing discharge of the planter, and whereby the operator may operate said controlling means without removing his hands from said handles.

A further object is to provide in a planter a novel control for the fertilizer discharge, whereby the amount of the fertilizer discharged may be varied by means of an adjustment, and whereby the discharge-opening may be closed and opened at will by the operator without disturbing the said adjustment.

Other advantages of the invention will be apparent as the invention becomes better understood by reference to the following description when considered in connection with the accompanying drawings, wherein—

Figure 1 is a side elevation of my improved planter; Fig. 2 is a plan view of the planter; Fig. 3 is an enlarged plan sectional view through the fertilizer hopper taken on the line 3—3 of Fig. 1; Fig. 4 is a transverse sectional view through the planter taken on the line 4—4 of Fig. 1, showing the lower portion of the fertilizer distributer in elevation and the fertilizer-discharge boot removed; Fig. 5 is a fragmentary plan view of the rear portion of the planter, illustrating the means for driving the seeding mechanism, the seed-box being removed but indicated in dotted lines; and Fig. 6 is a detail section taken on the line 6—6 of Fig. 5.

By referring to the drawings, it will be observed that the frame of the planter comprises a pair of spaced channel side-bars 7 connected intermediate their ends by a pair of spaced cross-bars 8. Upon a cross-shaft 9, journaled in brackets attached to the front ends of side bars, between the side-bars, a pair of carrying-wheels 11 is mounted, although a single carrying-wheel might be used, if desired. Each side-bar is turned downwardly at its rear end and carries a covering shovel 12. A pair of handle-beams 13 mounted on the side-bars so as to extend upwardly and rearwardly therefrom, are shaped to provide handles 14 at their rear ends, the handle-beams being suitably braced by bars 15.

Seeding and fertilizing discharge mechanisms mounted on the frame, preferably one in front of the other, are driven from the carrying-wheels through pitman driving connections, as will be more fully described hereinafter.

A drive-shaft 16 arranged cross-wise of the frame intermediate cross-bars 8 and journaled in bearings 17, on the side-bars 7, is provided at its ends with cranks 18 which are connected through pitmen 19 with cranks 21 on the ends of the cross-shaft 9. A bracket 22 bolted to the forward cross-bar 8 and serving as a pivot-support for the seeding-hopper provides a journal bearing 23 for the shaft 16 and a bearing 24 disposed transversely to the axis of the bearing 23. A seed-delivery casing 25 bolted to the rear cross-bar 8 is provided with a bearing 26 disposed coaxially with the bearing 24, and a shaft 27 is journaled in the said bearings 24 and 26. A picker-wheel 28 located within the casing 25 and adapted to coöperate with the seed-box or hopper is fixedly mounted on one end of the shaft 27, and a bevel-gear 29 is interposed between the bearings 24 and 26 and fixedly mounted on shaft 27 in mesh with a bevel-gear 31 which is formed integral with a sleeve 32 mounted loosely on the drive-shaft 16. A second bevel-gear 33 is formed integral with said sleeve 32, and a seed-box 34 containing seed-discharge mechanism of any suitable or preferred construction is detachably mounted on the bracket 22 and casing 25, the said seeding mechanism having a bevel-gear 35 indicated by dotted lines in Fig. 5 which meshes with the bevel-gear 33. The sleeve 32 which abuts against one end of the bearing 23 is held against axial movement on the shaft in the opposite direction by a pin 36 which passes through said shaft and projects into the annular recess 37 in the outer end of the sleeve within the radius of the clutch teeth thereof. A clutch-member 38 splined on the shaft as indicated in Fig. 6 is provided with a clutch face 39 which may be engaged with the clutch face 41 on the gear 33 by sliding the clutch member on the shaft.

From the foregoing it will be apparent that the drive-shaft 16 is in positive driving connection with the carrying-wheels 11, and that the seeding mechanism may be connected and disconnected from the said drive-shaft by operation of the clutch-member 38. A bell-crank lever pivoted at 42 to the casing 25 has one of its arms 43 bifurcated to engage the clutch-member 38 and has its other arm connected through means of a rod 44 to a relatively short hand-lever 45 pivoted at the under side of one of the handle-beams 13 in close proximity to its handle 14. A contraction spring 46 connecting one of the arms of the bell-crank lever with one of the brackets 17 normally holds the bell-crank lever in such position as to engage the clutch face 39 with the faces 41. In this manner the seeding mechanism is normally operative and in driving connection with the carrying-wheels and may be rendered inoperative by the operation of hand-lever 45 to withdraw the clutch-member 38 against the tension of spring 46. In Fig. 5 the clutch-member is shown as being held withdrawn and out of operative position by the operator. The seed discharged by the picker-wheel 28 into the seed-discharge conduit 30 is deposited in a furrow formed in the ground by any suitable or preferred furrow-opening means, as for instance by a furrow-opening shovel 40.

A fertilizer attachment designated generally by the reference character 47 is mounted on bracket 48 which is disposed forwardly of the seeding mechanism. A drive-shaft 49 journaled in bracket 48 has a pitman driving connection 51 at each end with the pitmen 19 and has a positive driving connection through bevel-gears 52 with the agitator or feeding member 53 located within the fertilizer hopper. It is thus seen that the fertilizer feeding means is in constant driving connection with the carrying-wheels. The hopper is provided with a discharge-opening 54 through which the fertilizer passes into the discharge-conduit 55 to be deposited in the path of the furrow-opening shovel 40. A member 56 located within the hopper is pivotally mounted at 57 whereby the said member may swing relatively to the said opening to control the amount of the fertilizer-discharge and to close the opening. An arm 58 arranged at the outer side of the hopper and fixedly connected to the member 56 is normally held by a contraction spring 59 to maintain the member 56 in an open position such as is shown in Fig. 3. The movement of said arm by the spring is limited by a stop 61 which may be mounted in any one of a plurality of holes 62 formed in a ledge 63 which extends laterally from the hopper. The arm is moved against the tension of the spring 59 to swing the member 56 to close the discharge-opening, by a rod 64 connected to a comparatively short hand-lever 65 mounted at the under side of one of the handle-beams in close proximity to its handle. It will be apparent from the foregoing that the member 56 is normally held by the spring 59 in an open position determined by the location of the stop 61, to control the amount of fertilizer to be discharged through the opening 54; and that the set position of the member 56 may be varied by changing the location of the pin 61 to thereby regulate the fertilizer-discharge. It is also obvious that by operating the hand-lever 65 the member 56 may be moved to close the opening 54 and stop the fertilizer discharge. Draft means of any suitable form may be attached to the forward end of the frame, although in the present drawings none is shown.

When the planter is in use the operator walks at the rear of the planter with his hands grasping the handles 14 to guide the implement, and when the end of the row is reached and the implement is being turned around to plant a new row, it is desirable to stop the discharge of the seed and fertilizer. It is obvious that with the seed and fertilizer mechanism controlling means I have provided, the operator without removing his hands from the handles may operate both levers 45 and 46 and instantly stop the discharge of seed and fertilizer, this operation being performed without causing any delay in turning the planter at the end of the row or causing the operator to release his grasp on the handles.

I claim:

1. A planter comprising a pair of spaced side-bars joined intermediate their ends by a pair of spaced cross-bars, a carrying wheel interposed between and mounted on the front ends of the side-bars, a handle-beam mounted on the rear portion of each side-bar, a bracket mounted on one of the cross-bars and carrying a journal bearing intermediate the cross-bars and arranged with its axis extending cross-wise of the side-bars, a shaft journaled in said bearing, a journal bearing mounted on each side-bar for each end portion of the shaft, a pitman connection between each end of the shaft and the carrying-wheel, a seeding mechanism including a bracket mounted on the other cross-bar, a shaft arranged at right angles to the first named shaft and having one end journaled in a bearing formed in the first named journal bearing, a bevel-gear connection between said shafts, the gear on the cross-shaft being loose thereon and the gear on the seeding-mechanism shaft being fixed thereto, a clutch-member mounted axially slidable on the cross-shaft for connecting and disconnecting the said cross-shaft and the bevel-gear thereon, and means manually operable from the rear of the planter for shifting said clutch member.

2. In a planter, the combination with a frame having a carrying-wheel mounted on its forward end, of a seeding mechanism and a fertilizer mechanism mounted on the frame, a pitman driving connection between the carrying-wheel and seeding mechanism, including a clutch so arranged that the pitman is in constant driving connection with the carrying-wheel and the clutch is operable to connect and disconnect the seeding mechanism with the pitman, a pitman connection between the fertilizer mechanism and the first named pitman whereby the fertilizer mechanism is in constant driving connection with the carrying-wheel, the fertilizer mechanism having a discharge opening, means for closing and opening said discharge opening, and manually operable means for operating said clutch and for operating said fertilizer discharge-opening controlling means.

3. In a planter of the character described, the combination of a frame, a traction-wheel mounted thereon, a seeding mechanism and a fertilizer mechanism mounted on the frame, permanent driving connection between the traction-wheel and the seeding and fertilizer mechanisms, a clutch interposed in the driving connection to the seeding mechanism whereby the same will be thrown into and out of operation, and means for controlling the discharge of the fertilizer mechanism at will without stopping the driving operation thereof.

LEWIS E. WATERMAN.

Witnesses:
R. A. HEMENWAY,
O. E. ROSS.